(12) United States Patent
Garcia

(10) Patent No.: US 10,596,891 B1
(45) Date of Patent: Mar. 24, 2020

(54) PROTECTIVE COVER ARRANGEMENT FOR VEHICLE

(71) Applicant: Angel L. Garcia, Miami, FL (US)

(72) Inventor: Angel L. Garcia, Miami, FL (US)

( * ) Notice: Subject to any disclaimer, the term of this patent is extended or adjusted under 35 U.S.C. 154(b) by 8 days.

(21) Appl. No.: 16/019,859

(22) Filed: Jun. 27, 2018

(51) Int. Cl.
*B60J 11/02* (2006.01)
*B60J 11/04* (2006.01)

(52) U.S. Cl.
CPC ............... *B60J 11/02* (2013.01); *B60J 11/04* (2013.01)

(58) Field of Classification Search
CPC ....................................................... B60J 11/04
USPC ............................................................ 296/98
See application file for complete search history.

(56) References Cited

U.S. PATENT DOCUMENTS

| | | | | |
|---|---|---|---|---|
| 3,050,075 A * | 8/1962 | Kaplan | ............. | B60J 11/02 296/98 |
| 4,929,016 A * | 5/1990 | Kastanis | ............. | B60J 11/02 296/136.03 |
| 5,516,181 A * | 5/1996 | Thompson | ............. | B60J 11/02 150/166 |
| 5,597,196 A | 1/1997 | Gibbs | | |
| 5,762,393 A * | 6/1998 | Darmas, Sr. | ............. | B60J 11/025 296/136.01 |
| 6,012,759 A * | 1/2000 | Adamek | ............. | B60J 11/02 296/136.03 |
| 6,412,851 B1 * | 7/2002 | Burks | ............. | B60J 11/02 160/370.22 |
| 6,935,674 B1 * | 8/2005 | Campos | ............. | B60J 11/00 296/136.1 |
| 7,237,826 B2 * | 7/2007 | Sagi | ............. | B60R 9/055 220/4.12 |
| 8,366,172 B1 * | 2/2013 | Morazan | ............. | B60J 11/00 296/97.1 |
| 9,428,039 B2 * | 8/2016 | Sassi | ............. | B60J 11/04 |
| 9,499,035 B1 * | 11/2016 | Chashchukhin | ......... | B60J 11/04 |
| 9,623,740 B1 * | 4/2017 | Tran | ............. | B60J 11/02 |
| 9,701,185 B1 * | 7/2017 | Usanga | ............. | B60J 11/02 |
| 9,718,339 B2 * | 8/2017 | Hissong | ............. | B60J 11/04 |
| 9,744,837 B2 * | 8/2017 | White | ............. | B60J 11/04 |
| 9,770,966 B1 * | 9/2017 | Gill | ............. | B60J 11/04 |
| 9,776,491 B1 * | 10/2017 | Williams | ............. | B60J 11/04 |
| 9,815,359 B2 * | 11/2017 | Morazan | ............. | B60J 11/04 |
| 9,925,855 B2 * | 3/2018 | Joao | ............. | B60J 11/08 |
| 9,981,540 B2 * | 5/2018 | Chen | ............. | B60J 11/02 |
| 10,035,412 B2 * | 7/2018 | Garnick | ............. | B60J 11/04 |
| 10,220,693 B2 * | 3/2019 | Yakubu | ............. | B60J 11/04 |

(Continued)

FOREIGN PATENT DOCUMENTS

WO WO-2010073070 A1 * 7/2010 ............. B60J 11/02

*Primary Examiner* — Pinel E Romain
(74) *Attorney, Agent, or Firm* — Sanchelima & Associates, P.A.; Christian Sanchelima; Jesus Sanchelima

(57) ABSTRACT

The present invention is a protective cover arrangement for a vehicle. The protective cover arrangement includes a housing and a cover cartridge positioned inside the housing. The housing is installed substantially in a middle of a roof of the vehicle. The cover cartridge includes two coiled-up rolls, namely a first roll including a cover sheet and a second roll including a cover sheet. When the cover sheets are pulled out, it causes the corresponding first roll and the second roll to unroll from spiral configuration to be disposed in deployed configuration, thus covering the vehicle. The cover sheets are rolled back into the corresponding rolls to dispose the protective cover arrangement in retracted configuration.

9 Claims, 4 Drawing Sheets

(56) References Cited

U.S. PATENT DOCUMENTS

| | | | | |
|---|---|---|---|---|
| 10,300,860 | B2* | 5/2019 | Bathelier | B60R 5/045 |
| 2001/0045758 | A1* | 11/2001 | Vieira-Soares | B60J 11/00 |
| | | | | 296/98 |
| 2002/0067048 | A1* | 6/2002 | Haddad, Jr. | B60J 7/085 |
| | | | | 296/98 |
| 2002/0140248 | A1* | 10/2002 | White | B60J 7/085 |
| | | | | 296/98 |
| 2008/0197662 | A1* | 8/2008 | Ehrenberger | B60R 5/047 |
| | | | | 296/98 |
| 2009/0167049 | A1* | 7/2009 | Lariviere | B60J 11/02 |
| | | | | 296/98 |

\* cited by examiner

PROTECTIVE COVER ARRANGEMENT FOR VEHICLE

BACKGROUND OF THE INVENTION

1. Field of the Invention

The present disclosure generally relates to cover for a vehicle, and more particularly, relates to a protective cover arrangement for a vehicle that can be automatically deployed or retracted to protect the vehicle from damage due to water or sunlight, as required.

2. Description of the Related Art

Exposure to water from rains or the like can cause damage to a vehicle. The damage may be in the form of, for example, the paint of the vehicle getting washed over a course of time. Snowstorms or hailstorms are even worse, as the weight of falling pieces can cause dents and other physical damage to the car. Moreover, most of the vehicles have metallic body which is a good conductor of heat, and thus absorbs heat to subsequently transfer this heat to the atmosphere inside of the vehicle. When the vehicle is parked in sunlight, the heat and other radiations from the sun makes the interior of the vehicle hot, thereby making it very unpleasant to enter the vehicle and travel. Further, the heat exposure to the body may cause damage to fabric and other upholstery in the interior of the vehicle, to name a few. Even exposure to wind can cause dirt built-up over the course of time which is not desirable.

A known solution is to cover the vehicle for as much time as possible to prevent direct impinging of water or sunlight on the vehicle. Most of known car covers available in the market are, generally, simple plastic sheets which have to be deployed manually by the owner of the car which is typically cumbersome and laborious. Due to the effort required, most of the car owners tend to not properly cover, or simply leave their vehicles uncovered. Moreover, when it is raining or in a snow storm, or similar bad weather, it is very hard to deploy the cover alone, even for an adult man, due to the usually heavy accompanying winds.

U.S. Pat. No. 5,597,196 (hereinafter the '196 patent) discloses a system for the deploying and storing of an automobile cover. The system is provided with a roller assembly that can be made to be pivotally disposed about the axis of an axle. Attached to the roller at one end and the axle at another end is a spring means. The roller assembly has attached to it a full body automobile cover. The cover having one end adapted to covering and being secured to the end of the automobile opposite from the trunk, and the other end attached to the roller. The cover wound around the roller assembly and the roller assembly is stored in the trunk compartment of the automobile. The cover can be unwound from and wound back onto the roller with the assistance of the spring biased roller. The operator can quickly deploy the cover by pulling it from the back of the trunk over the trunk lid, and over the car, securing it to front bumper. The trunk can be closed after the cover is secured to the front bumper, thus securing the system inside the trunk.

Although, the system of the '196 patent may provide means for automatically covering an automobile, but such system is complicated to install and operate. The system is designed to be installed inside the trunk of the vehicle which takes up valuable space. Moreover, the system is primarily designed to be permanently installed in the trunk of the vehicle, for example at the time of manufacturing of the car in the factory itself or by an expertise mechanical workshop, as it requires cutting into the trunk liners and to drill holes in the trunk of the car, and other similar installation steps.

Therefore, there is a need in the art to provide a cover for a vehicle which can be easily installed, and further be deployed with convenience. Documents describing the closest subject matter provide for a number of more or less complicated features that fail to solve the problems described above in an efficient and economical way. None of the documents suggest the novel features of the present invention.

SUMMARY OF THE INVENTION

It is one of the main objectives of the present invention to provide a protective cover arrangement for a vehicle which can be easily, and preferably automatically, deployed and retracted as desired.

It is another objective of the present invention to provide a protective cover arrangement for a vehicle which is easy to install over the vehicle without making any significant changes to the vehicle, such as drilling a hole or the like, or requiring any specialized tools.

It is yet another objective of the present invention to provide a protective cover arrangement for a vehicle which can provide adequate protection to the vehicle against sunlight, rains and the like, while leaving sufficient air gap for allowing dissipation of heat from the vehicle.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Illustrative embodiments of the present invention are described below. The following explanation provides specific details for a thorough understanding of and enabling description for these embodiments. One skilled in the art will understand that the invention may be practiced without such details. In some instances, well-known structures, processes and functions have not been shown or described in detail to avoid unnecessarily obscuring the description of the embodiments.

It shall be noted that unless the context clearly requires otherwise, throughout the description, the words "comprise," "comprising," "include," "including," and the like are to be construed in an inclusive sense as opposed to an exclusive or exhaustive sense; that is to say, in the sense of "including, but not limited to." Words using the singular or plural number also include the plural or singular number, respectively while adhering to the concepts of the present invention. Furthermore, references to "one embodiment" and "an embodiment" are not intended to be interpreted as excluding the existence of additional embodiments that also incorporate the recited features.

Figure 1:
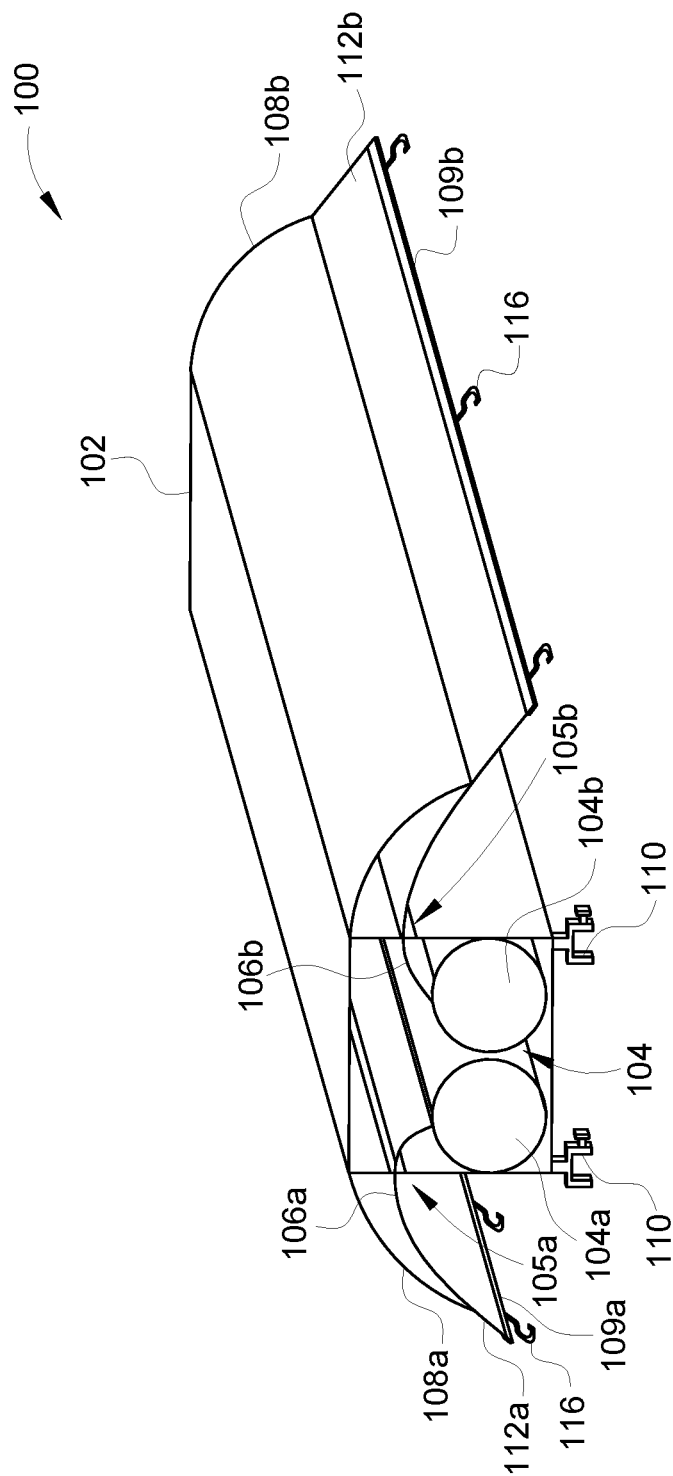
FIG. 1 illustrates a diagrammatic perspective view of a protective cover arrangement 100 in retracted configuration, showing wireframe depiction of a housing 102 therein and a cover cartridge 104 in folded form therefor, in accordance with one or more embodiments of the present invention.

Referring to the drawings, FIG. 1 illustrate a diagrammatic view of a protective cover arrangement (referred by the numeral 100), in accordance with one or more embodiments of the present invention. The protective cover arrangement 100 of the present invention is designed for rapid one-person deployment and rapid one-person retraction with optional automatic means for rolling up and rolling out the cover. The protective cover arrangement 100 creates air gaps or space between the covering, the roof and the windshield and rear windows of the vehicle to take advantage of the insulating properties of air for limiting heat transfer to the vehicle and to provide cushioning effect for preventing damage to the vehicle from hailstones or other falling debris. The protective cover arrangement 100 further promotes cross ventilation due to the airspace which may aid with dissipation of heat from the vehicle.

As illustrated in FIG. 1, the protective cover arrangement 100 includes a housing 102. FIG. 1 depicts the housing 102 in wireframe form to show arrangement and positioning of any component placed inside thereof. In one example, as illustrated, the housing 102 may be a rectangular body in the form of a truss or the like; however, in alternate examples, the housing 102 may have some other shape such as cylindrical or the like without any limitations. The housing 102 may generally be a hollow member which may be formed by welding together lengths of metallic pieces or pipes, and the like. The hollow form helps to minimize the weight of the housing 102, which, in turn, may help with transportation, and installation of the present protective cover arrangement 100 on a vehicle or the like. In some examples, the housing 102 may be reinforced and made of strong yet lightweight material, like stainless-steel, aluminum, or the like. Further, in some examples, the housing 102 may be provided with cross-members (as shown) to add strength thereto.

Further, as illustrated, the protective cover arrangement 100 includes a cover cartridge 104. In an embodiment, the cover cartridge 104 includes two coiled-up rolls, namely a first roll 104a and a second roll 104b. In particular, the first roll 104a includes a cover sheet 106a which is rolled up in a spiral configuration. Similarly, the second roll 104b includes a cover sheet 106b which is rolled up in a spiral configuration. When the cover sheets 106a and 106b are pulled out, it causes the first roll 104a and the second roll 104b to unroll from the spiral configuration, respectively. The pull force may cause the cover sheets 106a and 106b to move out and extend from the corresponding rolls 104a and 104b via openings 105a and 105b in the housing 102. The cover sheets 106a and 106b may be used for various applications, such as for covering a vehicle (as discussed in the subsequent paragraphs). In one or more examples, the cover sheets 106a and 106b may be large sized sheets sufficient to properly cover the vehicle. In one example, each of the cover sheet 106a and 106b may have a length of about 6-8 feet and a width of about 4-6 feet. Further, in one example, the cover sheets 106a and 106b may be made of waterproof, and sunlight resistant, or specifically ultra-violet (UV) resistant material, such as carbon fiber sheets; or canvas fabric sheets made of polyvinyl (PVC), polyurethane or some other suitable plastic material.

In an embodiment, the protective cover arrangement 100 may also include cover cleaners 108a and 108b extending from top ends of the housing 102 substantially in a same direction and manner of extension of the cover sheets 106a when pulled out therefrom. Thus, when the cover sheets 106a and 106b may be retracting back into the housing 102, the cover sheets 106a and 106b may scrape against the corresponding cover cleaners 108a and 108b which may cause cleaning of any dirt, debris, bird droppings, leaves, etc. stuck to outer surfaces thereof. The protective cover arrangement 100 may also include bars 109a and 109b provided at free ends 112a and 112b of the cover sheets 106a and 106b. Thus, the cover sheets 106a and 106b will stop retracting once the respective bars 109a and 109b at the end thereof meet with the corresponding cover cleaners 108a and 108b. This prevents the cover sheets 106a and 106b from retracting fully into the housing 102, so it is easier to pull out the cover sheets 106a and 106b later when desired for covering the car or the like. It may be understood that the bars 109a and 109b at the end of the cover sheets 106a and 106b may be bigger and/or wider than the gaps left between the cover cleaners 108a and 108b and the roof of the car to ensure that the cover sheets 106a and 106b does not go all the way into the housing 102 and stops at the cover cleaners 108a and 108b.

Figure 2:
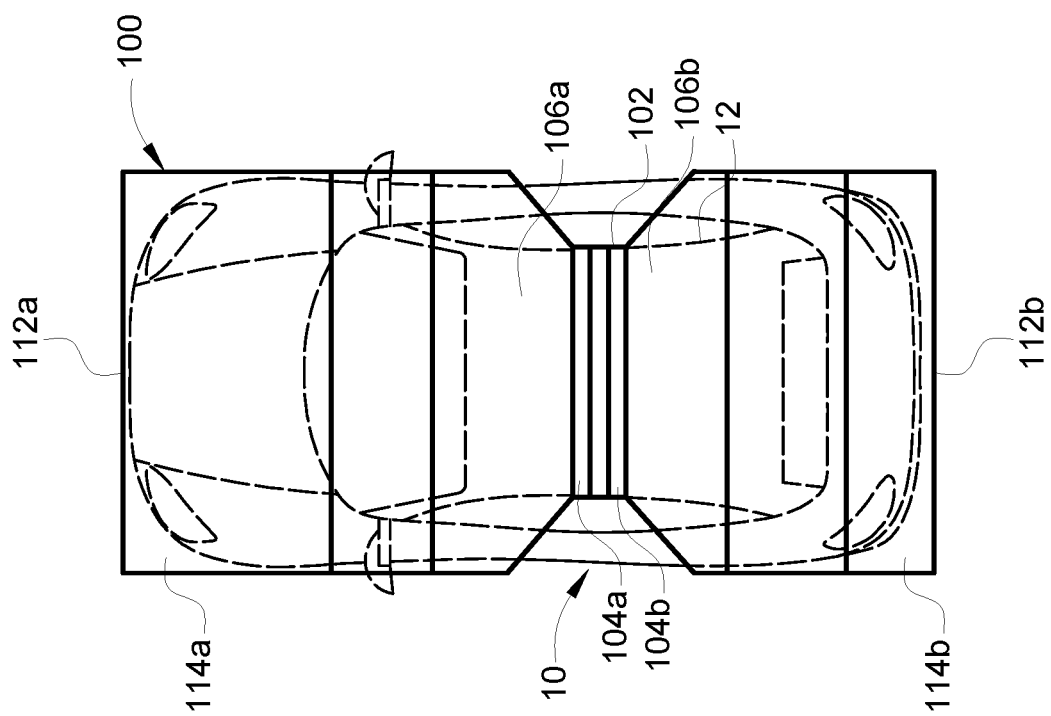
FIG. 2 illustrates a top planar view of a vehicle 10 with the protective cover arrangement 100 in deployed configuration arranged thereon, in accordance with one or more embodiments of the present invention.
Figure 3:
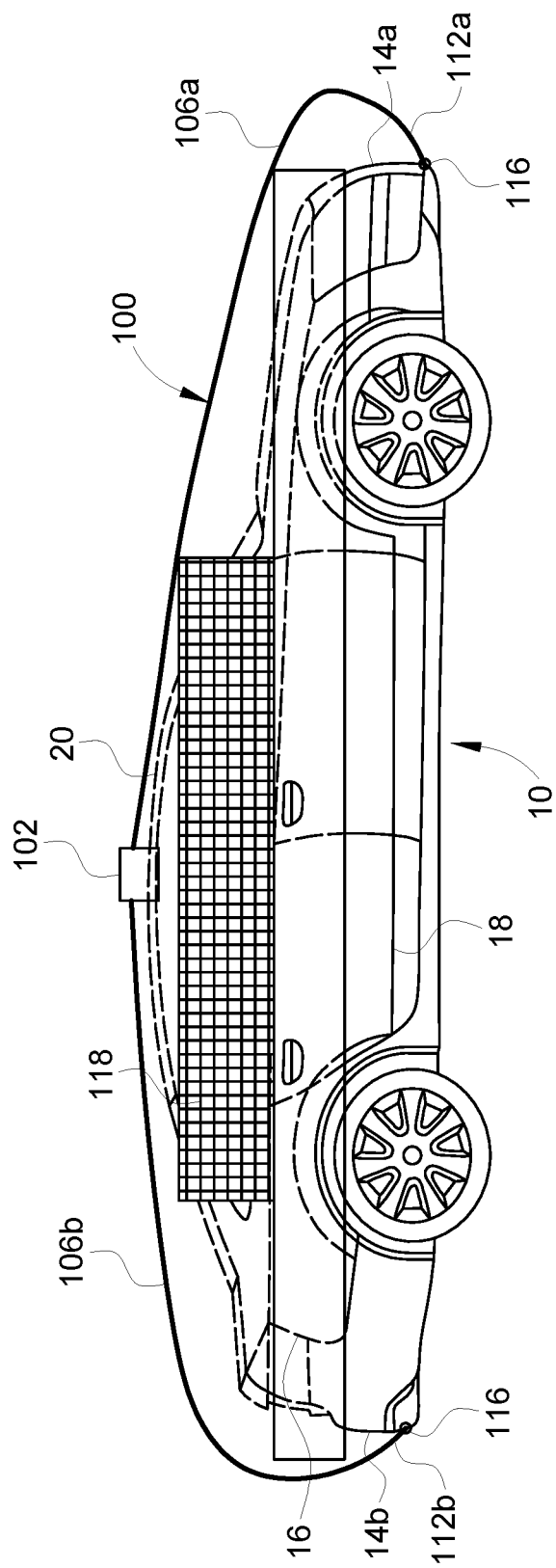
FIG. 3 illustrates a side planar view of the vehicle 10 with the protective cover arrangement 100 in deployed configuration arranged thereon, in accordance with one or more embodiments of the present invention.

Further, the protective cover arrangement 100 may include clamping members 110 which may be located at all four corners (only two shown) at a bottom of the housing 102. In the present example, each of the clamping member 110 may be shaped as a jaw which may be used to grip on to an edge of a surface to secure the housing 102 thereto. The clamping members 110 may be secured to, for example, a roof of the vehicle, without need of making any modification to the roof, and thereby installing the housing 102 on to the vehicle (as depicted in FIGS. 2 and 3). Furthermore, the protective cover arrangement 100 may include coupling members 116 associated with the bars 109a and 109b. The coupling members 116 may allow to secure or tie the cover sheets 106a and 106b against a surface of the vehicle for which the protective cover arrangement 100 is being implemented. In the present examples, the coupling members 116 may be hooks, rings or the like. In one or more examples, the middle coupling member 116 may be comparatively bigger than others, so in case the cover sheets 106a and 106b have to be manually placed, it is easier for the user to reach at least one of the coupling member 116 located with the housing 102 at the roof of the vehicle.

Referring to FIG. 2, the protective cover arrangement 100 is shown in deployed configuration and installed on to a vehicle 10. It may be seen that the housing 102 of the protective cover arrangement 100 is installed substantially in a middle of a roof 12 of the vehicle 10. As may be understood, the free end 112a of the cover sheet 106a may be pulled from the first roll 104a in the housing 102 and extended up to a front of the vehicle 10, forming a front cover portion 114a. Similarly, the free end 112b of the cover sheet 106b may be pulled from the second roll 104b in the housing 102 and extended up to a rear of the vehicle 10, forming a rear cover portion 114b. The cover sheets 106a and 106b may be proportioned such that the front cover portion 114a and the rear cover portion 114b together substantially cover the vehicle 10, when the protective cover arrangement 100 is in deployed configuration.

FIG. 3 also illustrates the protective cover arrangement 100 in deployed configuration and installed on to the vehicle 10. In some examples, as illustrated, the free end 112a of the cover sheet 106a may be secured to a front bumper 14a or some other component located in front of the vehicle 10. Similarly, the free end 112b of the cover sheet 106b may be secured to a rear bumper 14b or some other component located in rear of the vehicle 10. In one or more examples, the cover sheets 106a and 106b may be secured to the front and rear of the vehicle 10, respectively, using the coupling members 116. Also, as illustrated, the protective cover arrangement 100 in deployed configuration is arranged to cover sides 16 (only one shown), with doors 18 and the windows 20, of the vehicle 10.

As may be seen from FIG. 3, the protective cover arrangement 100 in deployed configuration provides an air gap between the cover sheets 106a and 106b, and the vehicle 10. This air gap allows for providing air in the space between the protective cover arrangement 100 and the vehicle 10, which may be helpful with dissipating heat from the vehicle 10. Further, as illustrated in FIG. 3, the protective cover arrangement 100 may provide a mesh window 118 which is located in front of the windows 20 in the side 16 of the vehicle 10, when the protective cover arrangement 100 is in deployed configuration. The mesh window 118 is sized to be substantially equal to a covered area of the windows 20 beneath thereof, when the protective cover arrangement 100 is in deployed configuration. The mesh window 118 may allow for providing air ventilation, for example, for passengers sitting inside the vehicle 10 with the windows 20 being opened. It may be contemplated that a similar mesh window may be provided on other side of the vehicle 10.

Figure 4B:
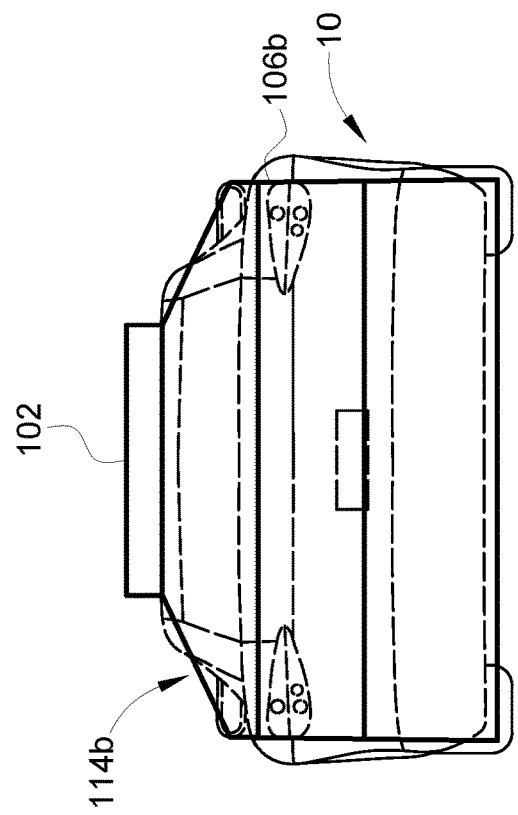
FIG. 4B illustrates a rear planar view of the vehicle 10 with the protective cover arrangement 100 in deployed configuration arranged thereon, in accordance with one or more embodiments of the present invention.
Figure 4A:
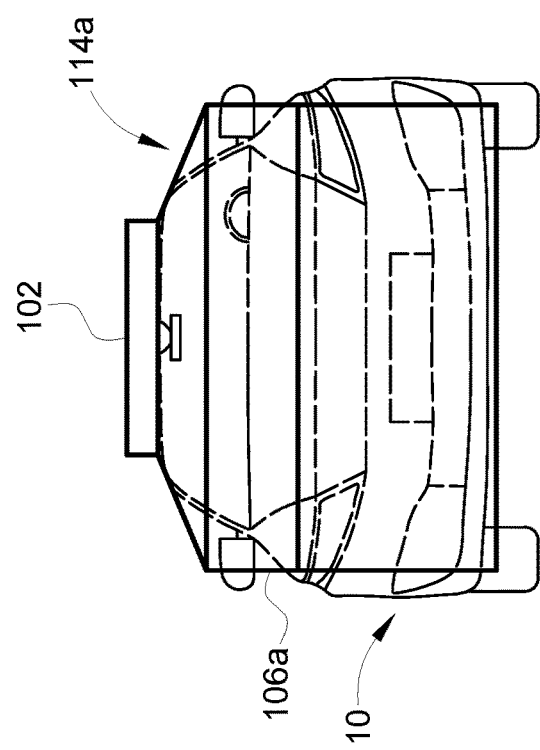
FIG. 4A illustrates a front planar view of the vehicle 10 with the protective cover arrangement 100 in deployed configuration arranged thereon, in accordance with one or more embodiments of the present invention.

FIGS. 4A and 4B illustrate front and rear views of the vehicle 10 with the protective cover arrangement 100 in deployed configuration. As seen in FIG. 4A, the cover sheets 106a may have sections defined in the front cover portion 114a, which contours to corresponding underneath sections of the vehicle 10. Similarly, as seen in FIG. 4B, the cover sheets 106b may have sections defined in the rear cover portion 114b, which contours to corresponding underneath sections of the vehicle 10. This ensures that the protective cover arrangement 100 completely and snugly covers the vehicle 10 while leaving sufficient spaces or air gaps between thereof for ventilation and heat dissipation purposes. In some examples, the sections of the cover sheets 106a and 106b corresponding to front wind shield and rear window of the vehicle 10 may be made transparent.

In an embodiment of the present disclosure, the protective cover arrangement 100 may include one or more electric motors (not shown) installed with the rolls 104a and 104b. The electric motors may be operated to rotate the rolls 104a and 104b in a manner to extend the respective cover sheets 106a and 106b, in order to dispose the protective cover arrangement 100 in deployed configuration. In some examples, the protective cover arrangement 100 may include a control (not shown) which may be in the form of a switch located on the housing 102 or inside of the vehicle 10, or in the form of a portable remote control to be carried by a user, for example in the keychain along with keys of the vehicle 10. Such control may be used to operate the electric motors when desired to automatically, without manual intervention, dispose the protective cover arrangement 100 in deployed configuration. Further, in an embodiment, the rolls 104a and 104b of the cover cartridge 104 may be appropriately tensioned using a spring or the like, thus making the rolls 104a and 104b to roll back the cover sheets 106a and 106b into the cover cartridge 104, when any external pulling forces on the corresponding cover sheets 106a and 106b are released. Thus, the rolls 104a and 104b may be made to automatically roll back on its own, thereby retracting the protective cover arrangement 100.

The protective cover arrangement 100 of the present invention may be removably installed on the vehicle 10. This allows the protective cover arrangement 100 to be removed from the vehicle 10 when desired for storage purposes. Therefore, the protective cover arrangement 100 may be removed and stored in a trunk of the vehicle 10 when not in use, for example, during driving of the vehicle 10. The protective cover arrangement 100 of the present invention protect exterior of the vehicle 10. The protective cover arrangement 100 helps prevent damage to paint of the vehicle 10, and keeps the vehicle 10 cleaner for a longer period of time as compared to when the vehicle is left exposed to external elements in the environment. The protective cover arrangement 100 further provides security to the vehicle 10. The protective cover arrangement 100 may be suitable to be used by vehicle owners living or working in places with no garages. The protective cover arrangement 100 helps the vehicle's owner to save money by keeping the vehicle clean for longer period of time, thus reducing the need of cleaning the vehicle 10. Although, the protective cover arrangement 100 has been shown to be used with the vehicle 10 being a car, it may be contemplated by a person skilled in the art that the present protective cover arrangement 100 may also be used with a motorcycle or the like with some modifications.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A protective cover arrangement for a vehicle, the protective cover arrangement comprising:
   a housing having two openings; and
   a cover cartridge comprising a first roll and a second roll arranged in the housing, each of the first roll and the second roll comprising a cover sheet rolled in a spiral configuration,
   wherein when the cover sheets are pulled out, the first roll and the second roll unroll from the spiral configuration to cause the cover sheets and to extend via the openings out of the housing, wherein said protective cover further includes cover cleaners extending from top ends of the housing substantially in a same direction of extension of the cover sheets when pulled out therefrom.

2. The protective cover arrangement of claim 1 further comprising bars provided at free ends of the cover sheets to stop the cover sheets while retracting back into the housing.

3. The protective cover arrangement of claim 2 further comprising coupling members provided with the bars to secure the cover sheets with a surface of the vehicle.

4. The protective cover arrangement of claim 3, wherein the coupling members comprise one of hooks and rings.

5. The protective cover arrangement of claim 1 further comprising clamping members located at a bottom of the housing to be secured to a roof of the vehicle.

6. The protective cover arrangement of claim 1, wherein the housing is a hollow member in order to allow arranging of the first roll and the second roll therein.

7. The protective cover arrangement of claim 1, wherein each of the cover sheet have a length of approximately 6 to 8 feet and a width of approximately 4 to 6 feet.

8. The protective cover arrangement of claim 1, wherein the cover sheets are made of waterproof and sunlight resistant materials.

9. The protective cover arrangement of claim 1 further comprising one or more electric motors installed with the first roll and the second roll to provide automatic extension thereof.

* * * * *